UNITED STATES PATENT OFFICE.

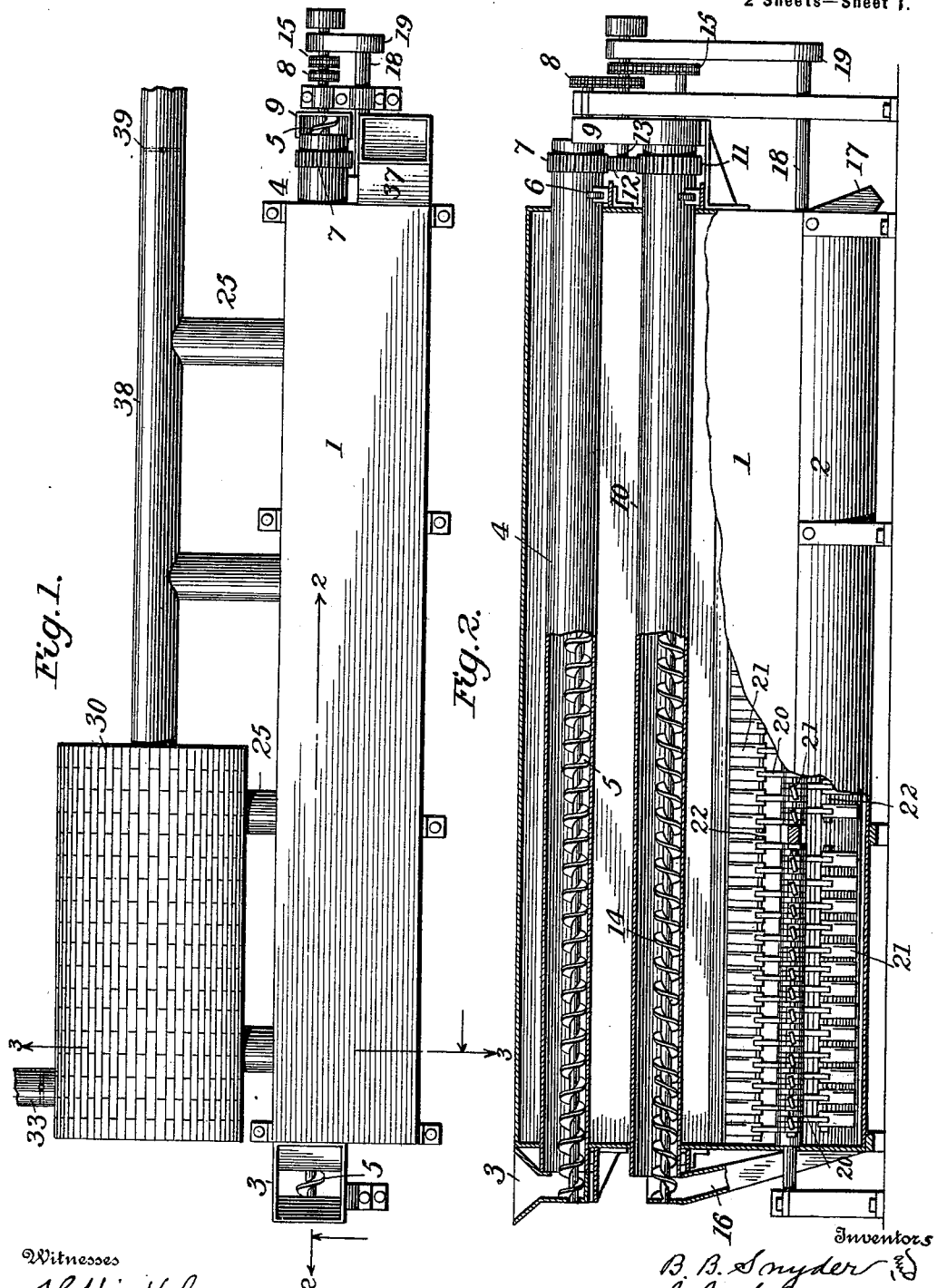

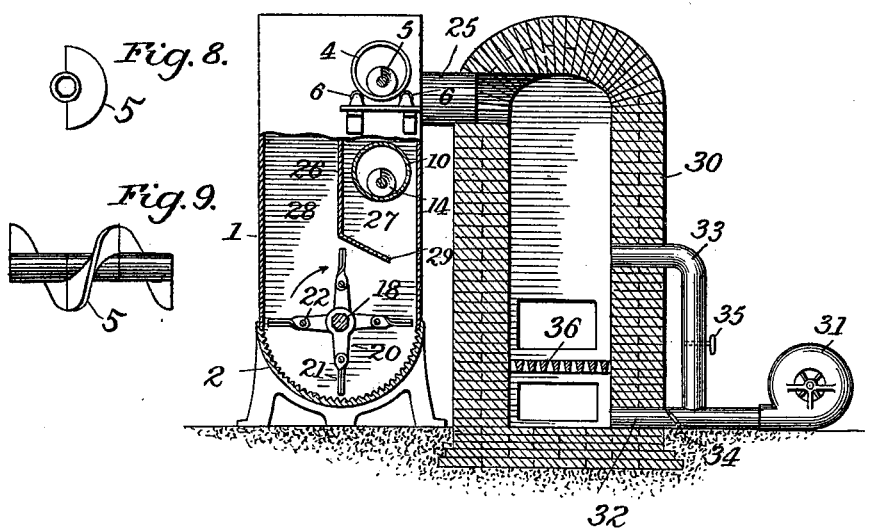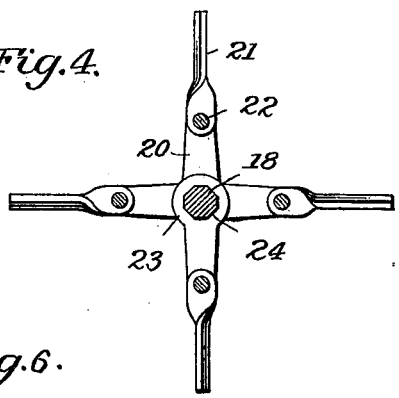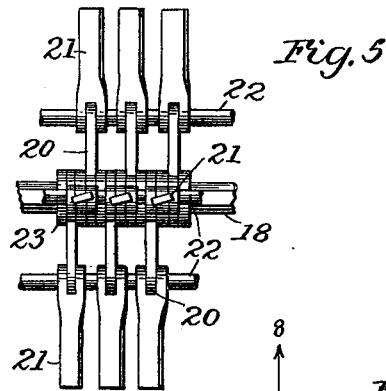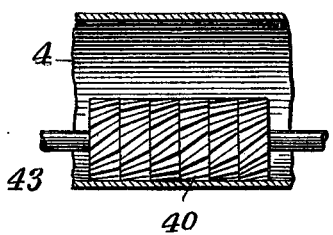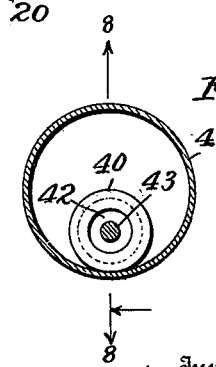

BENJAMIN B. SNYDER AND JONAS J. SELDNER, OF BALTIMORE, MARYLAND.

DRIER AND PULVERIZER.

SPECIFICATION forming part of Letters Patent No. 671,980, dated April 16, 1901.

Application filed April 5, 1898. Serial No. 676,531. (No model.)

*To all whom it may concern:*

Be it known that we, BENJAMIN B. SNYDER and JONAS J. SELDNER, citizens of the United States, residing at the city of Baltimore, in the State of Maryland, have invented certain new and useful Improvements in Driers and Pulverizers, of which the following is a specification.

This invention consists in an apparatus for pulverizing and drying fertilizers and other materials. The material to be operated on is carried through the apparatus in an unbroken stream, being subjected at all times to heat and to the action of screws and beaters, which pulverize and feed it along toward the outlet. During the latter part of the process the material is subjected to rotary beaters and at the same time to currents of heated air, which pass through the material while it is violently agitated, thus subjecting each particle to the action of the air and thoroughly drying it.

In the accompanying drawings, Figure 1 is a plan view of the apparatus. Fig. 2 is a side elevation, partly in section, on the line 2 2 of Fig. 1. Fig. 3 is a section on the line 3 3 of Fig. 1. Figs. 4 and 5 are detail views of the beaters. Figs. 6 and 7 are end and side views of a modified form of feeding and pulverizing device. Figs. 8 and 9 are details of the screws 5 and 14.

In the drawings, 1 indicates the outer casing of the drier, which, as shown, is rectangular in plan and provided with a semicircular trough or bottom 2. The material to be operated on enters a hopper 3 and is fed through a revolving cylinder 4 by means of a screw 5. The cylinder rests on roller-bearings 6 and is turned by a gear 7. The screw is turned, preferably in a direction opposite to that of the cylinder, by means of a chain or belt 8. From the cylinder 4 the material is delivered to a chute 9 and thence to a second cylinder 10, which is rotated by means of a gear 11, the gears 7 and 11 being driven by a pinion 12 upon a main shaft 13. The material is fed through the cylinder 10 by a screw 14, rotated by means of a chain or belt 15, the belts 8 and 15 being driven from the main shaft 13. The screws may, if desired, be driven by simple contact with the cylinders instead of being positively driven; but by positively driving the screws the material is less likely to accumulate and choke in the cylinders. Any number of cylinders and screws may be used. From the cylinder 10 the material is delivered through a chute 16 to the bottom of the casing, and it is conveyed along the bottom of the casing to a delivery-chute 17 by means of beaters which are fast upon a shaft 18, which is driven from the main shaft 13 by a belt 19. The beaters are shown in detail in Figs. 2 to 5, inclusive. They consist each of two parts—a part 20, rigidly attached to the shaft 18, and a blade 21, pivotally connected to the part 20, the face of the blade 21 being slightly inclined in order to feed the material lengthwise of the shaft. The pivoted blades 21 are connected to the rigid parts 20 by pivots 22, which, as shown, are rods strung through the series of beaters included between the shaft-bearings. Instead of the rods the beaters may be provided with individual pivots, if desired. As shown, each part 20 has a hub 23, in which is an octagonal opening 24, the part of the shaft 18 within the casing being of the same section and fitting the openings closely.

The machine thus far described may be used without a heating apparatus for pulverizing material, or the cylinders and screws may be used for this purpose independently of the beaters. To effect the drying of the material simultaneously with the pulverizing action, hot air or gases are forced into the casing through a series of pipes 25. The partition 26, which extends from the top of the casing down nearly to the beaters, directs the hot air around the cylinders 4 and 10 and thence down through the compartment 27 to one side of the beaters. The rotation of the beaters carries the air around the bottom of the casing, under the shaft 18, and up into the compartment 28 upon the opposite side of the partition 26. To render this circulation of the air more effective, the partition 26 may be provided with an extension 29 to cause the air to be discharged from the chamber 27 in a direction tangential to the movement of the beaters.

The air may be heated in any suitable manner. We prefer to use a furnace 30 and to direct the products of combustion through the pipes 25 by a forced draft. As shown, the air is driven into the furnace by a blower 31 through a pipe having a branch 32, which discharges under the grate 36 of the furnace, and a branch 33, which discharges above the grate. By manipulating dampers 34 35 in these pipes the temperature of the air and gases which are delivered to the drier may be regulated. When hot gases are required, the damper 35 is closed and the air is driven through the grate by means of the pipe 32. When cooler gases are desired, pipe 32 is cut off and the air is driven through the pipe 33. The dampers 34 35 may both be open at the same time, and by regulating them the heat of the gases delivered to the drier can be very easily controlled. Furthermore, control of the gases is additionally effected by means of a valve 39 in a pipe 38, leading to a suitable chimney. By stopping the blower and opening the valve 39 the supply of the heat to the drier can be completely cut off. In some instances the blower can be dispensed with and the necessary heat for the drier derived from natural draft.

The operation is as follows: The material is delivered into the hopper 3 continuously while the machinery is in operation. The screws 5 and 14 rest on the bottoms of the cylinders 4 and 10 and act as knives to cut and crush the material against the cylinders. If the cylinders were stationary, the crushing operation would not be so effective, and, furthermore, the cylinders would rapidly become worn at the point of bearing of the screws. By rotating the cylinders the wear is distributed throughout their circumference and their life is very much prolonged. The cylinders and screws may be operated in the same direction; but it is preferable to operate them in opposite directions. The material is delivered from the cylinder 10 into the bottom of the casing, which bottom, as shown in Fig. 3, is semicircular and provided with a roughened or serrated interior surface. The material is struck violently by the beaters 21 and rapidly pulverized. The pivoted blades 21 are free to swing backward in case an obstruction is in the way, such as a hard stone or other hard body, and breakage of the blades is thus prevented. The current of hot air which comes from the chamber 27 passes along with the beaters through the material in the trough 2. The beaters pulverize the material and toss the particles into the chamber 28, and in this manner each particle is subjected many times to the action of the hot air which passes up through the chamber 28. The dried and pulverized material is finally discharged through the chute 17, and the air from the chamber 28, laden with moisture, is discharged through the opening or chimney 37 at the end of the chamber 28.

In Figs. 6 and 7 we have shown a grinding and feeding device which may be substituted for the screws 5 and 14. This device comprises a revolving cylinder 4 and a screw consisting of sections 40, each section being provided with inclined teeth and grooves 41. These screw-sections are in the form of heavy disks, having large circular openings 42, through which loosely passes a rod 43. The disks rest on the bottom of the cylinder 4 and are driven by it. The rod 43 simply serves to keep them in place and approximately in line; but it is small enough to permit individual sections to rise and pass over obstructions. In operation these disks 40 pulverize the material and feed it along substantially in the same manner as do the screws 5 and 14. The disks 40 roll within the cylinders and are driven by them, the rods 43 being stationary.

The screws 5 and 14 are preferably cast in sections, each containing a half-turn of the screw-blade, as shown in Figs. 8 and 9. The hubs of these sections have polygonal openings which fit over a shaft of similar cross-section. The screws manufactured in this manner are very cheap and durable and are easily repaired.

One of the principal features of our invention is the arrangement of the partition 26, which directs the heated air and compels it to rotate along with the beaters 21, thereby bringing the air into intimate relation with the material to be operated on. This arrangement may be utilized in all forms of driers and also in evaporators for evaporating liquids of various kinds.

Another feature of importance is the relative arrangement of the feeding and pulverizing screw and its containing-cylinder. As hereinbefore pointed out and as shown in the drawings, the screw rests or bears directly against the inner surface of the cylinder. The blades of the screw therefore act as knives to cut entirely through and more thoroughly pulverize the material introduced into the cylinder than would be possible if the screw were out of contact with the cylinder. By having the screw arranged to bear directly against the cylinder-wall we are enabled to employ a long screw without being obliged to furnish a heavy and expensive shaft to support it. The screw-shaft can be made light enough to permit it to spring upward and ride over substances which are too hard to be immediately crushed by it, thus avoiding breakage or straining of the parts. The material is minutely and effectively pulverized as well as fed longitudinally of the cylinder by having the screw contact directly with the cylinder.

Having described our invention, what we claim, and desire to secure by Letters Patent, is—

1. In a grinding or pulverizing machine, the combination with a cylinder, of a feeding and pulverizing screw arranged within and resting throughout its length upon the cylinder, the diameter of the screw being less than that of the interior of the cylinder so that it can move radially thereof, and means for turning the cylinder.

2. The combination with a rotatable cylinder, of a feeding and pulverizing screw of less diameter than the interior of the cylinder, arranged within and having a cutting periphery resting upon the bottom of the cylinder, and means for rotating said cylinder.

3. In a pulverizing and drying apparatus, the combination of a casing, a cylinder extending longitudinally of the interior of said casing, means for supplying material to said cylinder, a pulverizing and feeding screw for reducing and moving the material toward a discharge-opening in the cylinder, a rotary beater arranged in the casing below said cylinder and arranged to move material delivered from said cylinder longitudinally of the casing, and means for introducing heated gases into said casing.

4. In a pulverizing and drying apparatus, the combination of a casing, two cylinders extending longitudinally of said casing, and connected together at one end, a supply-hopper communicating with one of said cylinders near its other end, a discharge spout or chute connecting the other cylinder with the interior of the casing, a pulverizing and feed screw arranged in each of said cylinders whereby material received from the hopper will be moved in opposite directions through said cylinders and then discharged into the casing, a rotary beater and feeding device arranged within the casing and adapted to act on the material discharged by said cylinders, and means for introducing heated gases into the casing while the material is passing therethrough.

In testimony whereof we affix our signatures in presence of two witnesses.

BENJ. B. SNYDER.
JONAS J. SELDNER.

Witnesses:
WM. P. RIGGS,
GEORGE KENT.